US012736503B2

(12) United States Patent
Song et al.

(10) Patent No.: US 12,736,503 B2

(45) Date of Patent: Sep. 15, 2026

(54) SYSTEM AND METHOD FOR DECONVOLUTION OF REAL-TIME MASS FROM THE INFLUENCE OF TEMPERATURE AND PRESSURE ON CRYSTAL MICROBALANCE

(71) Applicant: INFICON, Inc., East Syracuse, NY (US)

(72) Inventors: Chunhua Song, Jamesville, NY (US); Mohamed B. Rinzan, Manlius, NY (US); Steve James Lakeman, Newbury Park, CA (US); Lukas Baumgartel, Portland, OR (US); Matan Lapidot, Kibbutz Kfar (IL); Brian O'Neill, Lewis Center, OH (US)

(73) Assignee: INFICON, INC., East Syracuse, NY (US)

( * ) Notice: Subject to any disclaimer, the term of this patent is extended or adjusted under 35 U.S.C. 154(b) by 152 days.

(21) Appl. No.: 18/289,631

(22) PCT Filed: May 6, 2022

(86) PCT No.: PCT/US2022/027978
§ 371 (c)(1),
(2) Date: Nov. 6, 2023

(87) PCT Pub. No.: WO2022/235992
PCT Pub. Date: Nov. 10, 2022

(65) Prior Publication Data

US 2024/0241083 A1 Jul. 18, 2024

Related U.S. Application Data

(60) Provisional application No. 63/184,830, filed on May 6, 2021.

(51) Int. Cl.
*G01B 7/06* (2006.01)
*G01N 29/02* (2006.01)
(Continued)

(52) U.S. Cl.
CPC ......... *G01N 29/022* (2013.01); *G01N 29/036* (2013.01); *G01N 29/326* (2013.01)

(58) Field of Classification Search
CPC .. G01N 29/022; G01N 29/036; G01N 29/326; G01N 2291/02854;
(Continued)

(56) References Cited

U.S. PATENT DOCUMENTS 5,112,642 A 5/1992 Wajid
5,869,763 A 2/1999 Vig
(Continued)

FOREIGN PATENT DOCUMENTS

DE 102005062482 A1 * 11/2006 ........... C23C 14/547
JP 2004184256 A * 7/2004
(Continued)

OTHER PUBLICATIONS

European Patent Office; Extended European Search Report; European Patent Application No. 22799640.2; Dated: Jan. 24, 2025; 11 pages.
(Continued)

*Primary Examiner* — Robert R Raevis
(74) *Attorney, Agent, or Firm* — Barclay Damon LLP

(57) ABSTRACT

A system and method for determining the changes in resonance frequency in crystal microbalance (CM) sensors and the resulting changes in the determination of incremental mass on the CM sensors caused by temperature. Dual mode resonances and coefficients are used in a deconvolution process to determine and extract the frequency shift caused by temperature to provide the temperature compensated
(Continued)

incremental mass (ΔM). In one embodiment, dual mode analysis is provided using a mass mode (e.g., the c-mode fundamental frequency ($f^{c}_{100}$)) and a temperature mode (e.g., the anharmonic frequency ($f^{c}_{102}$)) and associated coefficients. In other embodiments that are more sensitive to temperature changes, dual mode analysis is provided using the b-mode fundamental frequency ($f^{b}_{100}$) as the temperature-mode and associated coefficients.

10 Claims, 7 Drawing Sheets

(51) Int. Cl.
*G01N 29/036* (2006.01)
*G01N 29/32* (2006.01)

(58) Field of Classification Search
CPC ............ G01N 2291/0426; G01B 7/066; G01B 17/02; G01B 17/025; G01G 3/16; G01G 3/18; G01K 7/32
USPC ....... 73/1.01, 1.02, 1.82, 54.41, 32 A, 61.79, 73/64.53, 579, 580, 651–655, 150 R, 865; 177/229, 50, 226, 210 FP
See application file for complete search history.

(56) References Cited

U.S. PATENT DOCUMENTS

2011/0027459 A1 2/2011 Lee et al.
2016/0097743 A1 4/2016 Tan et al.

FOREIGN PATENT DOCUMENTS

KR 20100069392 A * 6/2010 ............. H01L 22/12
WO 2020003246 A1 1/2020

OTHER PUBLICATIONS

U.S. Patent and Trademark Office as ISA (ISA/US), International Search Report and Written Opinion of the ISA from International Application No. PCT/US2022/027978, mailed Aug. 10, 2022.
India Patent Office; First Examination Report; Patent Application No. 202317082829; Dated: Jun. 30, 2026; 8 pages.
Japanese Patent Office; Notice of Reasons for Rejection; Japanese Application No. 2023-568141; Dated Jun. 16, 2026; 8 pages including English Translation of Rejection.
The International Bureau of WIPO; International Preliminary Report on Patentability; Dated: Oct. 24, 2023; 6 pages.
Vietnamese Patent Office; Notification No. 57942/SHTT-SC; Dated: Apr. 22, 2026; 2 pages.

* cited by examiner

SYSTEM AND METHOD FOR DECONVOLUTION OF REAL-TIME MASS FROM THE INFLUENCE OF TEMPERATURE AND PRESSURE ON CRYSTAL MICROBALANCE

CROSS-REFERENCE TO RELATED APPLICATION

This application is a national stage application pursuant to 35 U.S.C. § 371 of International Application No. PCT/US2022/027978, filed on May 6, 2022, which claims the benefit of and priority to U.S. Provisional Patent Application Ser. No. 63/184,830, filed May 6, 2021, and entitled "SYSTEM AND METHOD FOR DETERMINING THE CHANGE IN MASS FROM TOTAL RESONANCE FREQUENCY INFLUENCED BY TEMPERATURE," the entirety of which is incorporated herein by reference.

TECHNOLOGICAL FIELD

This application is generally directed to the field of measurement and monitoring, and more particularly to systems and related methods for process monitoring and control using crystal microbalance (CM) sensors (e.g., Quartz ($SiO_4$), Gallium Orthophosphate ($GaPO_4$), Langasite ($La_3Ga_5SiO_{14}$) crystals, etc.) The disclosed techniques may be used to directly or indirectly to monitor and/or control coating processes for manufacturing for a number of different applications and industries (e.g., semiconductor, OLED lighting and displays, and optical coating).

BACKGROUND

CM sensors have been integrated in, e.g., atomic layer deposition (ALD) and chemical vapor deposition (CVD) technologies. In a typical arrangement, a CM sensor with electrodes is placed in the feedback loop of an oscillator circuit as a frequency control element. The equivalent electrical admittance of the CM sensor is a maximum at its series resonance frequency, so the oscillator output tends to maintain itself at that frequency. Any change in the series resonance frequency of the CM sensor produces a corresponding change in the oscillator output frequency. As mass loading on the surface of the CM sensor increases, its resonance frequency or frequencies decrease. The vibrating CM sensor is coated in proportion to the coating on other substrates in the chambers and the reduction in its resonance frequency on account of mass loading is indicative of the coating mass on the CM sensor. Typically the shift in CM sensor resonance frequency also indicates the coating thickness on the substrates. The resonance frequency is a highly sensitive measure of the applied coating mass (or thickness). The rate of change in resonance frequency over time indicates the trending coating or deposition rate, i.e., change in mass (or thickness) per unit time. The resonance frequency change is proportional to the mass of the deposited material that has been added to the CM sensor.

The CM sensor is used in applications where the temperature and the pressure are tightly maintained. In addition to being dependent upon the mass of material deposited on the CM sensor, the resonance frequency of the CM sensor is also dependent upon other factors present during the application, such as temperature and pressure. Thus, the frequency change measured by a CM sensor is not only affected by changes in mass, but also by temperature, pressure, as well as other factors. For this reason, a specific crystal cut is selected to match the application to reduce error influences from temperature and pressure. This means the tolerance of the crystal cut has to be very high and different cuts are needed for different applications. While this may seem simple or trivial to achieve, it involves a tedious process of validation prior to using for the intended application. More importantly, even with the use of specific crystal cuts, there is a huge burden on the user to maintain a tight process control of temperature and pressure.

In the field of semiconductors, with respect to changes in temperature, in a typical application, a precursor that is being used requires ampoule heating in order to vaporize/sublimate the precursor. Depending upon the location of the CM sensor, the temperature of the CM sensor may be impacted (e.g., increased) by that heating or by exposure to the precursor. For example, some of the unused heated vaporized precursor may travel through the chamber or the foreline where the CM sensor is located and raise the temperature of the CM sensor. With respect to pressure, in ALD and CVD processes, the different recipe steps induce a change in pressure in the process chamber, to which the CM sensor is fluidly connected. Therefore, the resonance frequency is affected by the pressure changes as well.

Since the changes in temperature and pressure can cause corresponding changes in the resonance frequency of the CM sensor, in order to accurately correlate the mass loading on the substrate and the CM sensor based on the changes in resonance frequency caused only by the mass loading, these changes in temperature and pressure of the CM sensor (e.g., the respective frequency shifts) must be accounted for and separated out.

Currently, there are several techniques used to try to control the effects of temperature on CM sensors. For example, in some applications (e.g., in the semiconductor field), the CM sensor's temperature is not controlled, which introduces a cumulative frequency change. In the OLED display and optical coating fields, water cooling is used to maintain CM sensor at a fixed temperature to minimize temperature fluctuation. By designing the crystal to have a turning point in its frequency vs. temperature characteristic to match the controlled temperature, it is possible to eliminate the influence of temperature on real-time monitoring of thickness rate. However, in semiconductor applications, maintaining the CM sensor at a fixed temperature is difficult as deposition and etch processes have recipes that have multiple steps, with some of them changing the chamber and foreline temperatures. As the CM sensor has a very low thermal mass, it yields to temperature changes easily during heat exchange with its ambient environment. Additionally, as each step of the recipe changes on the order of seconds, it is impossible to maintain the temperature of the CM sensor by an integrated feedback controlled heating/cooling element. A solution then is to employ one or more thermocouples (TCs) to monitor the temperature of the CM sensor, and filter out the influence on the frequency due to any temperature change. In another application, a dual crystal technique is used in which the temperature coefficient of the crystals are matched. However, the difference of the physical locations of the CM sensors may introduce significant measurement errors based on an often incorrect assumption that there is no thermal lag between the two crystals. In the thermocouple and dual-crystal solutions, it is difficult to obtain the mass loading frequency change and temperature frequency change simultaneously. Also, the temperature at the thermocouple location is not exactly the same as the CM sensor temperature which introduces error. In addition, the temperature change is often very rapid and the thermocouple cannot reflect the real, instantaneous temperature of the CM sensor under such fast changing environment. Heat transfer via radiative coupling will also affect the CM and TC differently owing to the different emissivity of the TC and CM materials.

U.S. Pat. No. 5,869,763, entitled "Method for Measuring Mass Change Using a Quartz Crystal Microbalance," proposes solutions for automatically compensating for variations in the temperature of the CM sensor. The patent discloses forming a CM sensor, which is excited in two different modes at the same time in order to independently measure the mass change and the temperature change. In the patent, a doubly rotated quartz crystal cut such as an SC-cut is used. The SC-cut crystal is excited simultaneously on a b-mode acoustic wave and a c-mode acoustic wave, with the b-mode being highly sensitive to temperature and the c-mode being much less temperature sensitive. Alternatively, the SC-cut crystal is excited in the c-mode on its fundamental frequency ($f^c_{100}$) and its third overtone ($f^c_{300}$), and a temperature sensitive beat frequency can be derived from these two modes. According to the patent, the frequencies of both the b-mode and the beat frequency derived from the two c-modes are monotonic and nearly linear functions of temperature. These proposed solutions, however, have several problems.

For example, in the solution employing the b-mode, there appears to be a mode conversion for this mode in the range of 100° C. to 116° C., which results in the b-mode not being monotonic or a linear function of temperature in that range. In the solution deriving a temperature sensitive beat frequency, the amplitude of the c-mode of the fundamental frequency ($f^c_{100}$) and third overtone ($f^c_{300}$) are measured. The amplitude of the third overtone ($f^c_{300}$) is ⅑ of the fundamental frequency ($f^c_{100}$). With the mass accumulation, the signal of the third overtone ($f^c_{300}$) degrades faster than that of fundamental ($f^c_{100}$) so that the frequency of the resonance may not be detected by any circuits. If the third overtone ($f^c_{300}$) cannot be detected then the beat frequency cannot be derived. The patent teaches that this beat frequency can be derived by subtracting three times the fundamental mode frequency from the third overtone frequency, or by subtracting one third of the third overtone frequency from the fundamental mode frequency. Since the value of three times the fundamental mode frequency is very close to the value of the third overtone frequency (and therefore the value of one third of the third overtone frequency is very close to the value of the fundamental mode frequency), the beat frequency can be very small. Detection of the change in the beat frequency requires monitoring at least ten periods of the beat signal. Accordingly, in the beat frequency method, the update times for mass and temperature changes are much longer. For applications such as ALD that demand fast mass updates, this is compromised by the inability to do the temperature compensation at the same pace. Another drawback of the patent is that it assumes a linear monotonic change in frequency with the temperature which can produce inaccurate compensated thickness rate, specifically in the field of semiconductors where the temperature signal dominates the mass signals often and it is the mass signal that is important to monitor the process.

SUMMARY

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

A system and method for determining the changes in resonance frequency in crystal microbalance (CM) sensors and the resulting changes in the determination of incremental mass on the CM sensors caused by temperature is disclosed. Dual mode resonances and coefficients are used in a deconvolution process to determine and extract the frequency shift caused by temperature to provide the temperature compensated incremental mass (Δm). In one embodiment, dual mode analysis is provided using a mass mode (e.g., the c-mode fundamental frequency ($f_c^{100}$)) and a temperature mode (e.g., the anharmonic frequency ($f^c_{102}$)) and associated coefficients. In other embodiments that are more sensitive to temperature changes, dual mode analysis is provided using the b-mode fundamental frequency ($f^b_{100}$) as the temperature-mode and associated coefficients.

When implemented in a manufacturing process where the CM sensor is mass loaded, the dual mode analysis of the c-mode fundamental frequency ($f^c_{100}$), the anharmonic frequency ($f^c_{102}$), and/or the b-mode fundamental frequency ($f^b_{100}$) will provide information on frequency shift caused by mass loading, temperature change, pressure change, and any intrinsic stress change for each frequency. However, each resonance frequency will have different temperature sensitivities and responses, and different mass sensitivities and responses. By using their individual mass sensitivities and temperature sensitivities, the frequency shift caused by the mass change can be separated out from the frequency shift caused by the temperatures changes to provide a more accurate determination of the mass loading.

This invention overcomes some of these problems discussed above by including the higher order terms of the temperature characteristic of the CM sensor. Additionally, the invention generalizes the temperature compensation to cover all types of crystal cuts. Finally, the patented solution is proposed for use with an exemplary SC-cut crystal due to the SC-cut crystal's stress compensation feature. The solution would also be suitable for use with AT-cut crystals, which are widely used in OLED display, optical coating, or other fields due to the cost and manufacturability advantages. The solution can also be used to overcome thickness errors on display panels and optical filters caused by source thermal shock events.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF DRAWINGS

A more particular description of the invention briefly summarized above may be had by reference to the embodiments, some of which are illustrated in the accompanying drawings. It is to be noted, however, that the appended drawings illustrate only typical embodiments of this invention and are therefore not to be considered limiting of its scope, for the invention may admit to other equally effective embodiments. Furthermore, the drawings may contain text or captions that may explain certain embodiments of the present disclosure. This text is included for illustrative, non-limiting, explanatory purposes of certain embodiments detailed in the present disclosure. Thus, for further understanding of the nature and objects of the invention, references can be made to the following detailed description, read in connection with the drawings in which.

DETAILED DESCRIPTION

Figure 1:
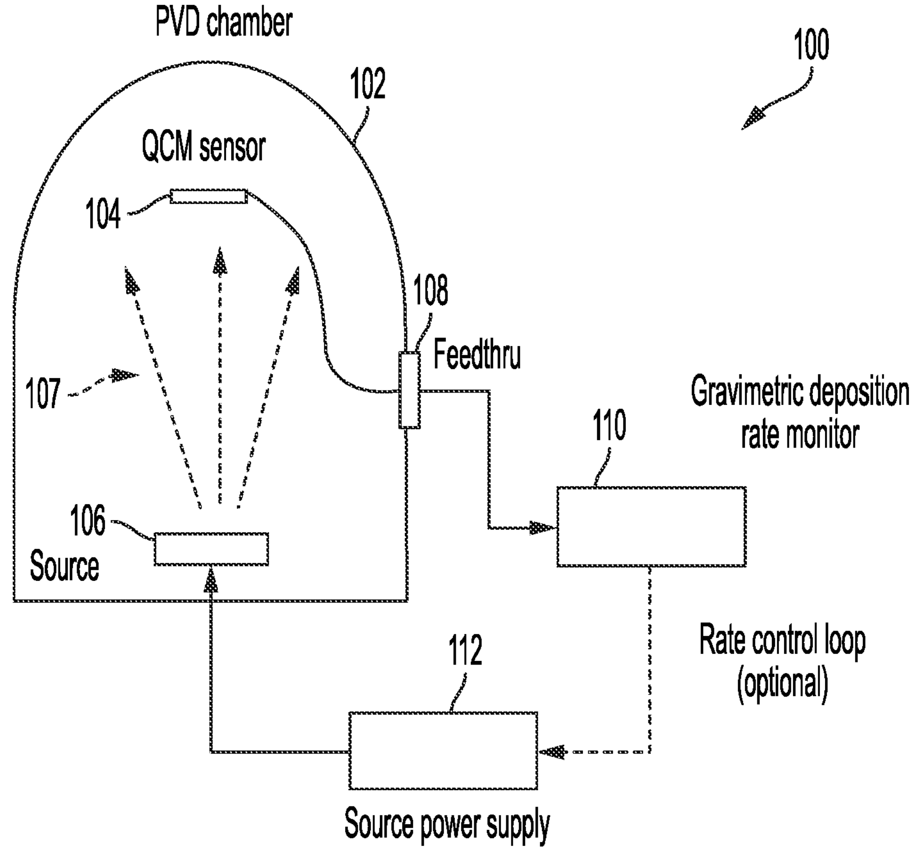
FIG. 1 illustrates a CM sensor for measuring a thin film deposition rate in a typical vacuum evaporation application.

It will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein-as understood by the ordinary artisan based on the contextual use of such term-differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

FIG. 1 depicts a measurement system 100 in which a CM sensor 104 (e.g., a QCM sensor) is used for measuring thin film deposition rate in a process chamber 102, in a typical vacuum evaporation application. In the example of FIG. 1, a source 106 is used to deposit a material 107 with the chamber 102. The CM sensor 104 sends signals through a feedthrough 108 to a gravimetric deposition rate monitor 110. A feedback control loop may be used to control the deposition rate by modulating the source power supply 112, in that the deposition rate information can be optionally used to generate a voltage signal to control the deposition rate, either manually or in a feed-back control loop.

In one embodiment, dual mode analysis is provided by the c-mode fundamental frequency ($f^c{}_{100}$) and the b-mode fundamental frequency ($f_b^{100}$). For example, in an application involving a SC-cut crystal with a very small mass loading on the CM sensor (e.g., ALD process) and a temperature where there is no mode conversion (e.g., below 100° C.), where even higher temperature sensitivity may be required than provided by the anharmonic frequency ($f^c{}_{102}$), the b-mode fundamental frequency ($f^b{}_{100}$) can be used. In addition to being highly temperature sensitive, the b-mode fundamental frequency ($f^b{}_{100}$) is also a nearly linear function of temperature like the anharmonic frequency ($f^c{}_{102}$).

In still another embodiment, the system can evaluate conditions and determine which dual mode technique should be used (i.e., c-mode fundamental frequency ($f^c{}_{100}$)) and anharmonic frequency ($f^c{}_{102}$), or c-mode fundamental frequency ($f^c{}_{100}$) and b-mode fundamental frequency ($f^b{}_{100}$) and switch between the techniques as required). More specifically, the advantage of higher temperature sensitivity of the b mode can be used either side of the temperature where the mode cross-over occur and the region of mode cross-over can be covered by monitoring the anharmonic mode ($f^c_{102}$). The system allows monitoring multiple modes simultaneously; therefore the foregoing could be achieved if the application temperature spans the mode conversion point of the CM sensor.

When implemented in a manufacturing process where the CM sensor is mass loaded, the dual mode analysis of the c-mode fundamental frequency ($f^c_{100}$), the anharmonic frequency ($f^c_{102}$), and/or the b-mode fundamental frequency ($f^b_{100}$) will provide information on frequency shift caused by mass loading, temperature change, pressure change, and any intrinsic stress change for each frequency. However, each resonance frequency will have different temperature sensitivities and responses, and different mass sensitivities and responses. By using their individual mass sensitivities and temperature sensitivities, the frequency shift caused by the mass change can be separated from the frequency shift caused by the temperatures changes to provide a more accurate determination of the mass loading.

In one embodiment where the dual mode analysis is provided by the c-mode fundamental frequency ($f^c_{100}$) and anharmonic frequency ($f^c_{102}$), the following exemplary equations can be used to determine the change in temperature ($\Delta$T) and the temperature compensated mass loading ($\Delta$m).

For a given resonance mode of the CM, the change in frequency due to both change in mass and temperature can be derived by the sum of integration of incremental mass change and the temperature change over a measurement integration time, as follows.

$$f = f(m, T)$$

$$df = \frac{\partial}{\partial m} f(m, T) \cdot \mathrm{dm} + \frac{\partial}{\partial T} f(m, T) \cdot dT$$

$$\Delta f = \int \frac{\partial}{\partial m} f(m, T) \mathrm{dm} + \int \frac{\partial}{\partial T} f(m, T) dT$$

$$\Delta f = \lambda_3 \cdot \Delta T^3 + \lambda_2 \cdot \Delta T^2 + \lambda_1 \cdot \Delta T + \lambda_0 \cdot \Delta m$$

Using the mode coefficients and the mass sensitivity coefficients to be discussed below, the frequency shift of the less temperature-dominant mode, $\Delta f_M$, at the c-mode fundamental frequency ($f^c_{100}$) and the frequency shift of the more temperature-dominant mode, $\Delta f_T$, at the anharmonic frequency ($f^c_{102}$) (hereinafter referred to as the mass-mode and temperature-mode, respectively) can be written as:

$$\Delta f_M = \lambda_{M_3} \cdot \Delta T^3 + \lambda_{M_2} \cdot \Delta T^2 + \lambda_{M_1} \cdot \Delta T + \lambda_{M_0} \cdot \Delta m$$

$$\Delta f_T = \lambda_{T_3} \cdot \Delta T^3 + \lambda_{T_2} \cdot \Delta T^2 + \lambda_{T_1} \cdot \Delta T + \lambda_{T_0} \cdot \Delta m$$

Subscript M denotes the mass-mode and subscript T denotes the temperature-mode. Accordingly, $f_M$ may denote foo and $f^c_{100}$ may denote any one of $f^c_{102}$, $f^b_{100}$, ($3f^c_{100}-f^c_{300}$), or ($f^c_{100}-f^c_{300}$). The selection for the temperature-mode depends on the type of crystal-cut. For example, AT-cut does not have a b-mode. The mode coefficients and the mass sensitivity coefficients are denoted by.

The general solution for $\Delta$T is then given by:

$$\Delta T^3 + \frac{(\lambda_{M_2} \cdot \lambda_{T_0} - \lambda_{T_2} \cdot \lambda_{M_0})}{(\lambda_{M_3} \cdot \lambda_{T_0} - \lambda_{T_3} \cdot \lambda_{M_0})} \cdot \Delta T^2 + \frac{(\lambda_{M_1} \cdot \lambda_{T_0} - \lambda_{T_1} \cdot \lambda_{M_0})}{(\lambda_{M_3} \cdot \lambda_{T_0} - \lambda_{T_3} \cdot \lambda_{M_0})} \cdot \Delta T + \frac{\lambda_{M_0}}{(\lambda_{M_3} \cdot \lambda_{T_0} - \lambda_{T_3} \cdot \lambda_{M_0})} \cdot \Delta f_T + \frac{-\lambda_{T_0}}{(\lambda_{M_3} \cdot \lambda_{T_0} - \lambda_{T_3} \cdot \lambda_{M_0})} \cdot \Delta f_M = 0$$

As can be seen in the equation, the value for $\Delta$T can be determined once the values for the frequency shift of the mass-mode ($\Delta f_M$) and the frequency shift of the temperature mode ($\Delta f_T$) are determined along with knowing the mode coefficients and the mass sensitivity coefficient ($\lambda_M$'s) of the mass-mode and the mode coefficients and the mass sensitivity coefficient ($\lambda_T$'s) of the temperature-mode to be discussed below.

It was verified that the change in mode coefficients of both the mass-mode and the temperature-mode is negligible over moderate mass-loading on the CM. For example, a mass loading of 9 kA of Aluminum (0.1 milligram) did not show any change in the temperature mode coefficients of c-mode ($f^c_{100}=f_M$) and its anharmonic ($f^c_{102}=f_T$) for an SC-cut crystal.

Tracking the change in frequency of the mass-mode ($f_M$) and the temperature-mode ($f_T$) allows determination of $\Delta$T from the above equation. The monitoring system tracks the two modes alternatively to evaluate $\Delta$T and through it, the temperature compensated incremental mass ($\Delta$m), providing a real-time temperature compensated process monitoring. The true mass change ($\Delta$m) is given by:

$$\Delta M = \frac{\Delta f_M - (\lambda_{M_3} \cdot \Delta T^3 + \lambda_{M_2} \cdot \Delta T^2 + \lambda_{M_1} \cdot \Delta T)}{\lambda_{M_0}}$$

For a high sensitivity case, the anharmonic frequency ($f^c_{102}$) of the temperature-mode can be replaced by the b-mode fundamental frequency ($f^b_{100}$).

Figure 2:
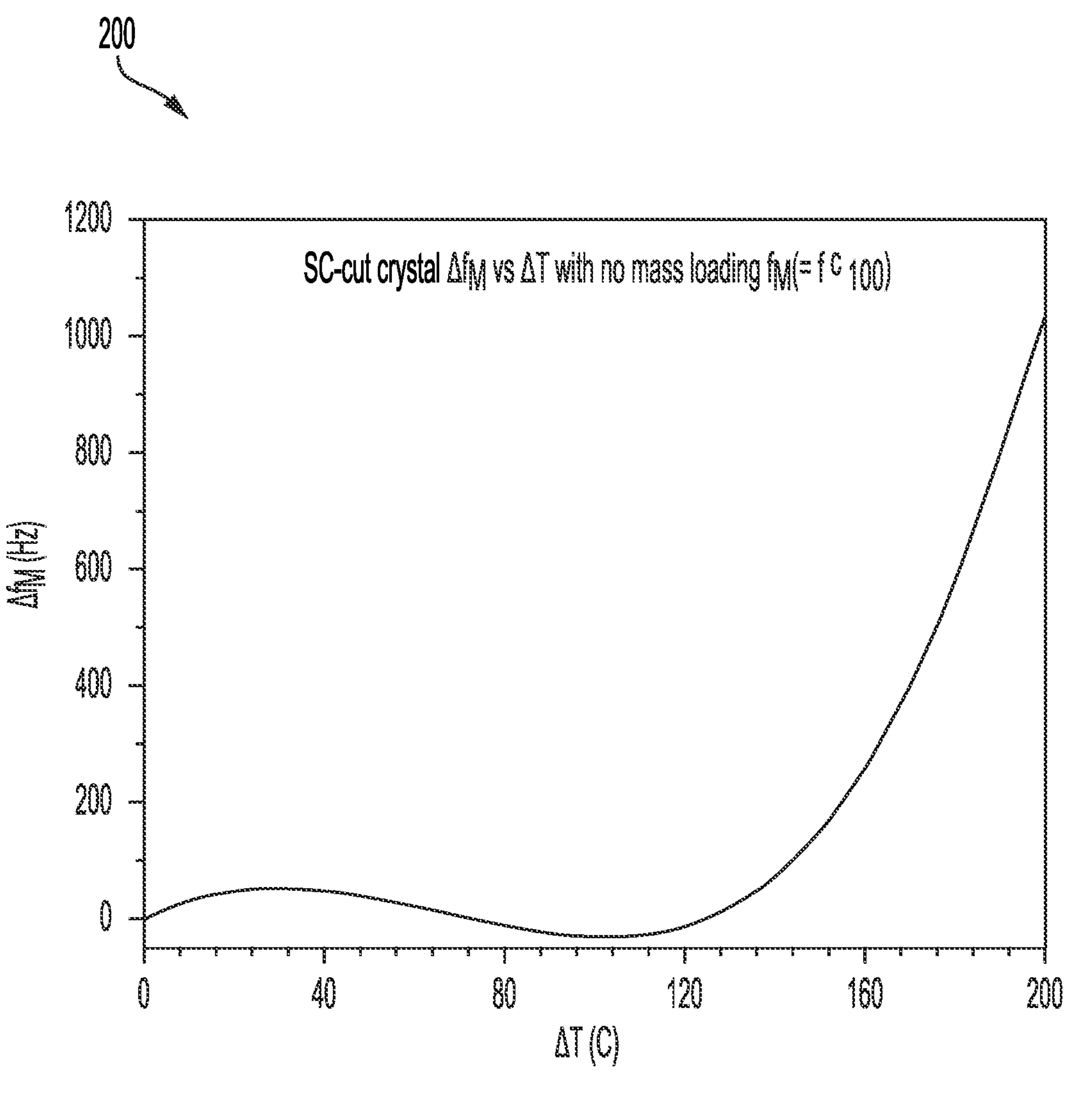
FIG. 2 illustrates the temperature characteristic of the c-mode fundamental frequency ($f_c^{100}$) of an SC-cut CM across a range of temperatures with no mass loading.

FIG. 2 illustrates a plot 200 of the resonance frequency of the c-mode fundamental ($f^c_{100}$), referred to as the mass-mode, across a range of temperatures for an SC-cut CM sensor without mass loading ($\Delta$m=0). The temperature is plotted as $\Delta$T with the reference being the room temperature (28.2° C.) while the frequency is plotted as $\Delta$f with the reference being the room-temperature fundamental resonance frequency (5984848 Hz). As can be seen in FIG. 2, the resonance frequency of the c-mode fundamental frequency ($f^c_{100}$) is relatively stable (i.e., not very sensitive to temperature changes) over a range of temperatures but is not a linear function of temperature with a lower and upper turning point present on either side of the inflection point, which is around 93° C.

Figure 3:
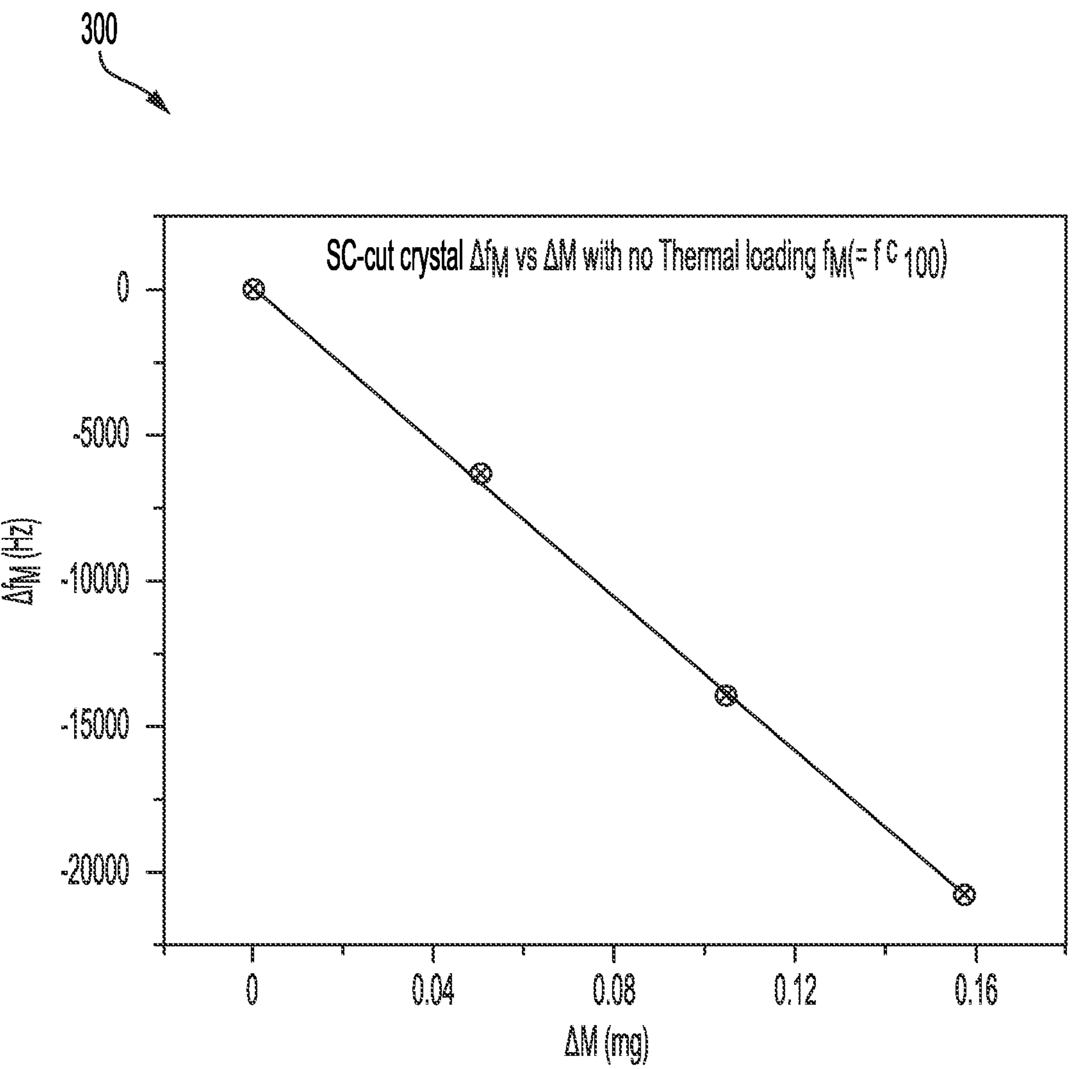
FIG. 3 illustrates the characteristic of the c-mode fundamental frequency ($f^c{}_{102}$) of an SC-cut CM across a range of film mass load under constant temperature.

FIG. 3 illustrates a plot 300 of the resonance frequency of the c-mode fundamental ($f^c_{100}$), referred to as the mass-mode, across a range of mass loading, for the same SC-cut CM sensor as in FIG. 2. The true mass loading data were gravimetrically measured at room temperature ($\Delta$T=0). The mass loading is plotted as $\Delta$M with the reference being the room-temperature mass of the unloaded CM while the frequency is plotted as $\Delta$f with the reference being the unloaded room-temperature fundamental frequency. The mass-sensitivity of the mass-mode was derived from a linear fit to data.

The following exemplary mode coefficients and mass sensitivity coefficient ($\lambda_M$'s) of the mass-mode were derived by fitting analysis from the data collected in FIGS. 2 & 3.

Using mode coefficients up to $3^{rd}$ degree eliminates the limitation of treating the characteristic of the c-mode fundamental frequency ($f^c_{100}$) as linear resulting in accurate deconvolution of mass loading.

$$\lambda_{M2} = 5.147E - 4\ \text{Hz}/C^3$$

$$\lambda M_2 = -0.099\ \text{Hz}/C^2$$

$$\lambda_{M2} = 4.394\ \text{Hz}/C$$

$$\lambda M_2 = -1.31845.6\ \text{Hz}/\text{mg}$$

Figure 4:
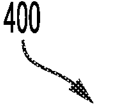
FIG. 4 illustrates the temperature characteristic of the c-mode anharmonic frequency ($f^c{}_{102}$) of an SC-cut CM across a range of temperatures under no mass loading.
Figure 4:
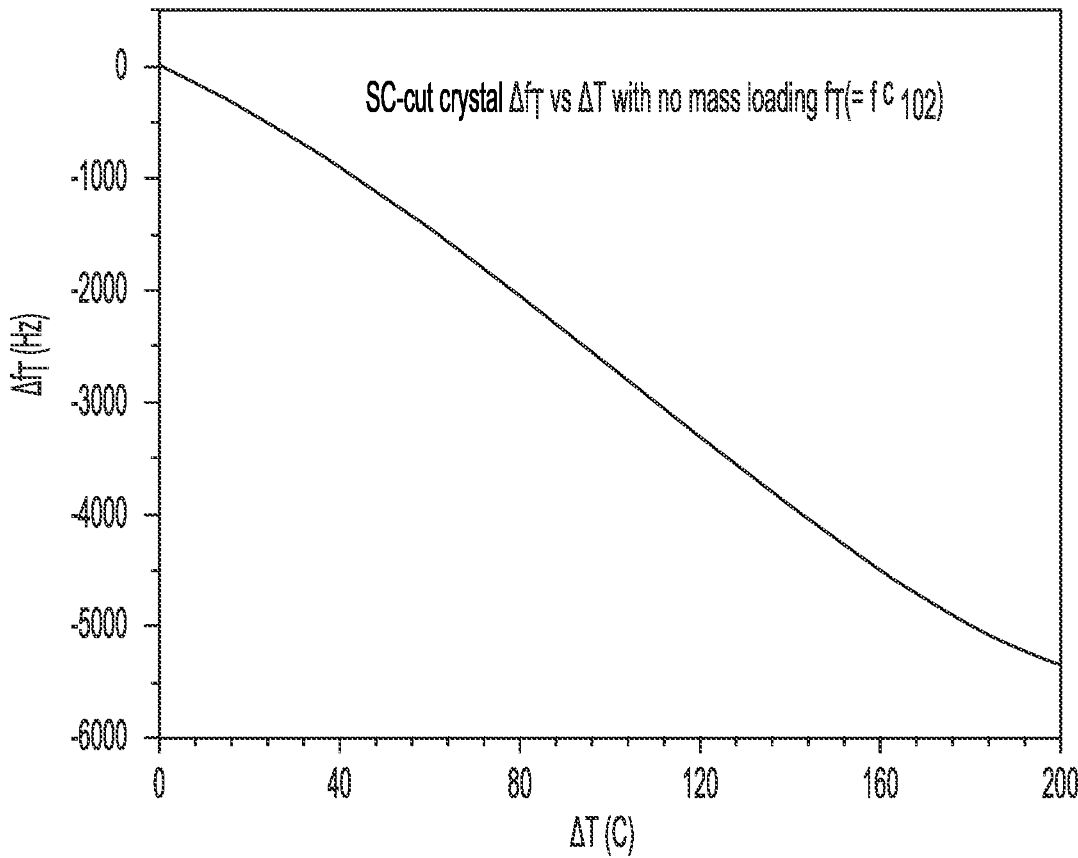

FIG. 4 illustrates a plot 400 of the characteristics of the c-mode anharmonic frequency ($f^c_{102}$), referred to as the temperature-mode, across a range of temperatures without mass loading (ΔM=0) for the same SC-cut CM sensor, as in FIGS. 2 and 3. The temperature is plotted as ΔT with the reference being the room temperature (28.2° C.) while the frequency is plotted as Δf with the reference being the room-temperature anharmonic resonance frequency (6186685 Hz). As can be seen in FIG. 4, the resonance frequency of the c-mode anharmonic mode ($f^c_{102}$) is more sensitive to temperature changes than its fundamental mode ($f^c_{100}$).

Figure 5:
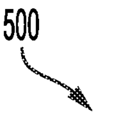
FIG. 5 illustrates the characteristic of the c-mode anharmonic frequency ($f^c{}_{102}$) of an SC-cut CM across a range of film mass load under constant temperature.
Figure 5:
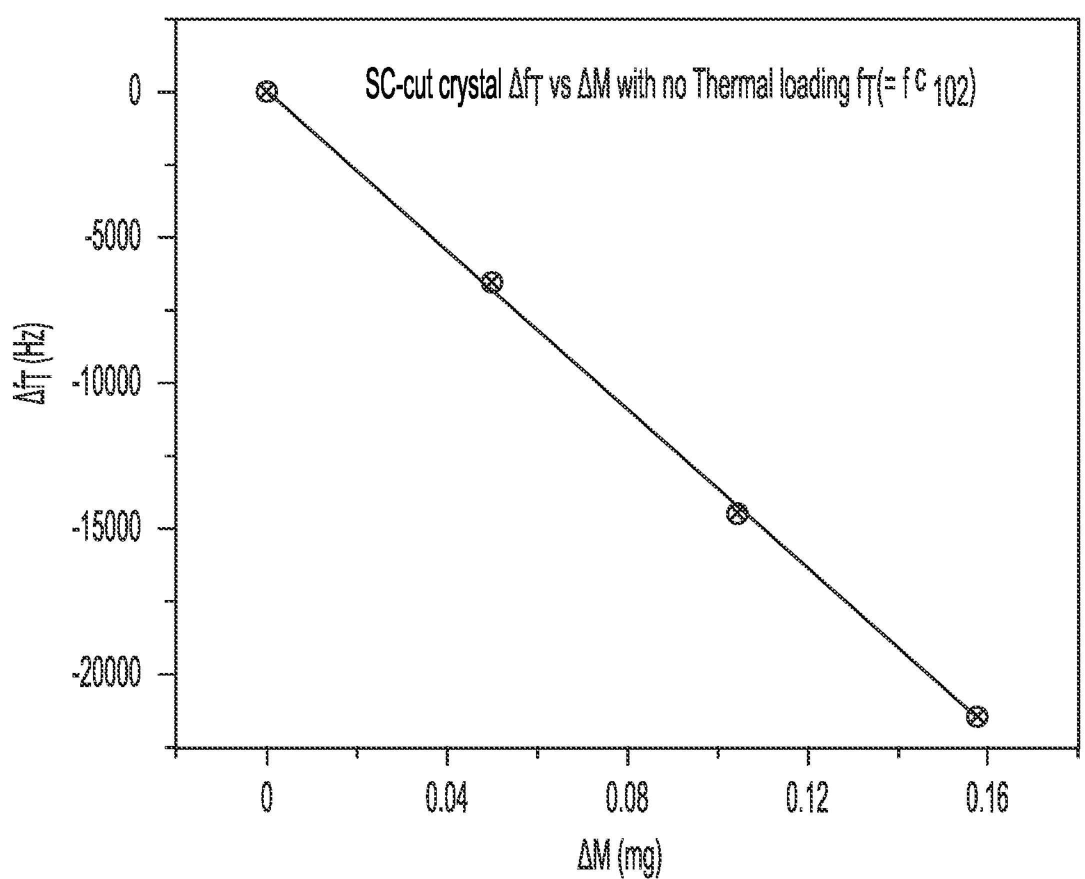

FIG. 5 illustrates a plot 500 of the resonance frequency of the c-mode anharmonic ($f^c_{102}$), referred to as the temperature-mode, across a range of mass loading, for the same SC-cut CM sensor as in FIGS. 2, 3, and 4. The true mass loading data were gravimetrically measured at room temperature (ΔT=0). The mass loading is plotted as ΔM with the reference being the room-temperature mass of the unloaded CM while the frequency is plotted as Δf with the reference being the unloaded room-temperature anharmonic frequency. The mass-sensitivity of the temperature-mode was derived from a linear fit to data.

The following mode coefficients and mass sensitivity coefficient ($\lambda_T$'s) of the temperature-mode were derived by fitting analysis.

$$\lambda_{T2} = 4.625E - 4\ \text{Hz}/C^3$$

$$\lambda T_2 = -0.139\ \text{Hz}/C^2$$

$$\lambda T_2 = -17.59\ \text{Hz}/C$$

$$\lambda_{T2} = -136341.9\ \text{Hz}/\text{mg}$$

It will be understood that although FIGS. 2, 3, 4, and 5 are based on the performance of an SC-cut CM sensor, similar relative performances with respect to temperatures sensitivity for the c-mode fundamental frequency ($f^c_{100}$) (i.e., less temperature sensitive) and anharmonic frequency ($f^c_{102}$) (i.e., more temperature sensitive) will be provided by an AT-cut CM sensor. Accordingly, this dual mode analysis using the c-mode fundamental frequency ($f^c_{100}$) and anharmonic frequency ($f^c_{102}$) can be used for AT-cut crystals typically used in OLED display production, optical coating, and other fields due to cost and manufacturability advantages over SC-cut crystals. In one embodiment, the CM sensor is a quartz crystal as shown in FIG. 2. In another embodiment the CM sensor is a Gallium Orthophosphate ($GaPO_4$) crystal or a Langasite ($La_3Ga_5SiO_{14}$) crystal, which will allow for use of the dual mode analysis in higher temperature applications.

In providing dual mode analysis using the c-mode fundamental frequency ($f^c_{100}$) for mass-mode, and anharmonic frequency ($f^c_{102}$), and/or the b-mode fundamental frequency ($f^b_{100}$) for temperature-mode, a single crystal is used to separate the frequency shift from mass loading and temperature change. This resolves the problems associated with earlier temperature compensation solutions that required separately located crystals or thermocouples.

Figure 6:
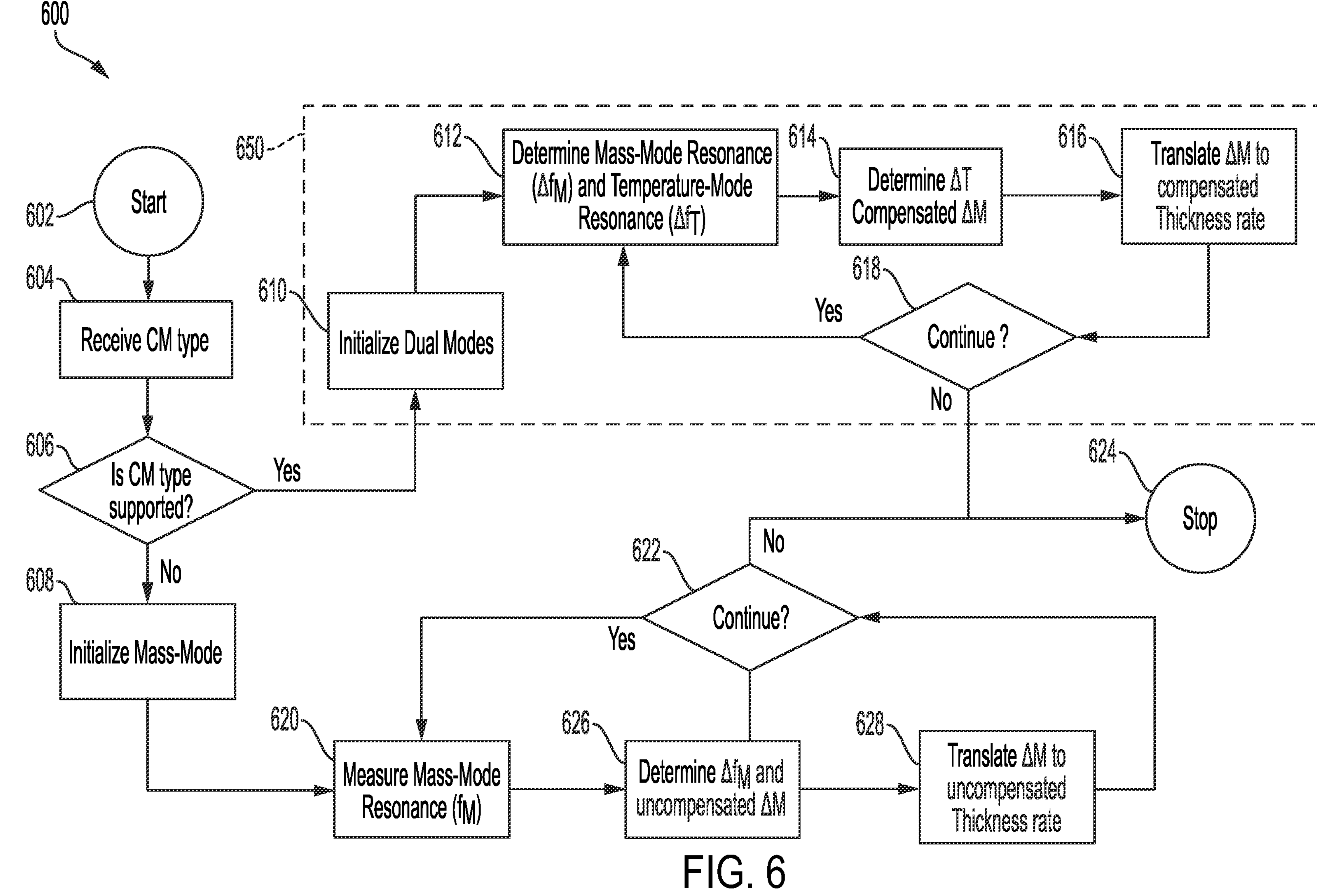
FIG. 6 illustrates a work flow of one embodiment for monitoring either a single mode of resonance or dual mode of resonances in the CM connected to the monitor.

FIG. 6 illustrates a work flow 600 of an exemplary method for determining the thickness rate in a coating process used in manufacturing for a number of different applications and industries (e.g., semiconductor, OLED lighting and displays, and optical coating). In one aspect, a dual-mode temperature compensation method 650 is employed. After the start 602 of the process workflow 600, a user inputs and/or the system receives the type of CM to be used in the application or manufacturing process at step 604. At step 606, the monitoring system's processor(s) (e.g., microcontrollers) determines whether that identified CM is supported. The type of CM's that are supported can have mode coefficients and the mass sensitivity coefficient for the two modes (mass-mode, e.g., at the c-mode fundamental frequency ($f^c_{100}$), and the temperature-mode, e.g., at the anharmonic frequency ($f^c_{102}$), as described above) stored in a non-volatile memory. Based on the user input about the type of CM used, the relevant coefficients (e.g., mode coefficients and mass sensitivity coefficients) will be used by the processor(s) of the monitoring system along with the real-time monitored $\Delta f_M$ and $\Delta f_T$ to calculate and report the temperature compensated deposition rate during an application.

If the system determines that the identified CM is supported at step 606 ("Yes"), the processor(s) of the system initializes the dual modes (i.e., mass-mode and temperature mode) at step 610 by conducting a frequency sweep to determine the initial resonance frequencies of each mode (e.g., $f_M$(t=0) and $f_T$(t=0)). Once the dual-modes are initialized at step 610, the monitoring system will measure the mass-mode resonance ($f_M$) and temperature-mode resonance ($f_T$) at the next pre-determined time (e.g., $f_M$(t=100 ms) and $f_T$(t=100 ms)) at step 612. Determining the change in frequency of the mass-mode ($\Delta f_M$) and the temperature-mode ($\Delta f_T$) at step 612 along with knowledge of the mode coefficients and the mass sensitivity coefficient for the two modes (mass-mode, e.g., at the c-mode fundamental frequency ($f^c_{100}$), and the temperature-mode, e.g., at the anharmonic frequency ($f^c_{102}$)) allows determination of ΔT from the above equations at step 614. The monitoring system tracks the two modes alternatively to evaluate ΔT. Once ΔT is known along with knowledge of the mode coefficients and the mass sensitivity coefficient for the two modes, allows determination of the temperature compensated mass (ΔM) also at step 614.

Once the temperature compensated incremental mass (ΔM) is known at step 614, it is translated using conventional techniques to the thickness rate of the particular film using film parameters at step 616. At step 618, the monitoring system determines whether to continue the dual-mode temperature compensation method 650 or not. If the method 650 does not continue, it stops at step 624. If the method continues, steps 612, 614, 616, and 618 are repeated at the next time increment (e.g., every 100 ms).

FIG. 6 also shows the workflow for a single mode (e.g., mass mode) thickness rate calculation. For example, if at step 606, the system determines that the identified CM is not supported ("No"), at step 608, the system initializes a single mode (i.e., the mass-mode) by conducting a frequency sweep to identify the initial resonance frequency of the mass mode ($f_M$(t=0)). Once the made mode is initialized at step 610, the monitoring system will measure the mass-mode resonance ($f_M$) at the next pre-determined time (e.g., $f_M$(t=100 ms)) at step 620. At step 626, the system determines the frequency shift of the mass-mode ($\Delta f_M$) and the uncompensated mass change (ΔM). Once the uncompensated incremental mass (ΔM) is known, it is translated using conventional techniques to the thickness rate of the particular film using film parameters at step 628. At step 622, the monitoring system determines whether to continue the single-mode temperature compensation method or not. If the method does not continue, it stops at step 624. If the method continues, steps 620, 626, 628, and 622 are repeated. In the event either a second temperature-mode is not available for the installed CM sensor or the temperature-mode becomes unstable or lost during monitoring, the thickness calculation can be defaulted to a single mode and use any learning done during the time the second temperature-mode was available. This can be the case during a semiconductor application where the wafer recipe is cycled constantly.

Figure 7:
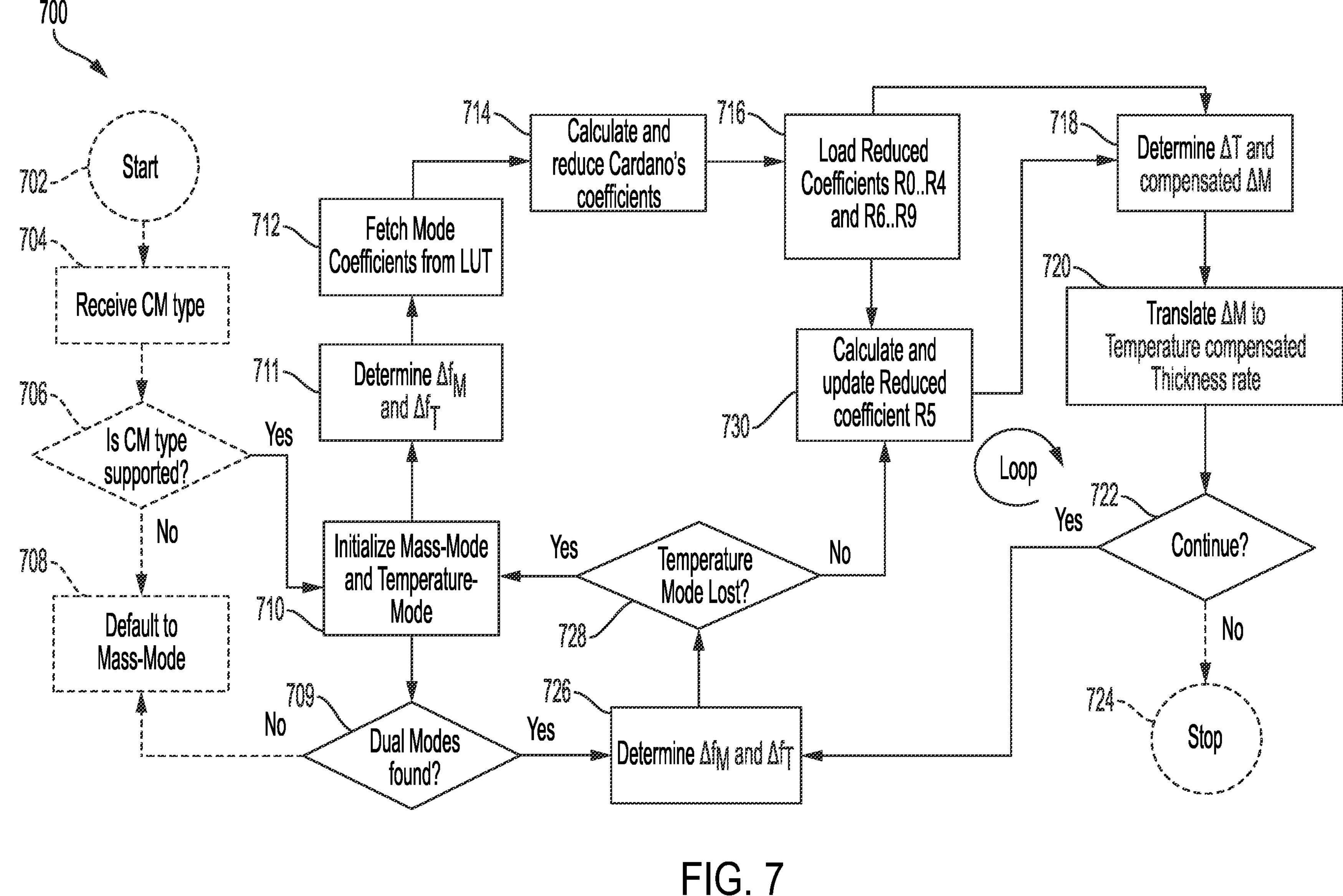
FIG. 7 illustrates a work flow of another embodiment for monitoring either a single mode of resonance or dual mode of resonances in the CM connected to the monitor.

FIG. 7 illustrates a higher level workflow of the dual-mode temperature compensation method 650 shown in FIG. 6. Similar to FIG. 6, after the start 702 of the process workflow 700, a user inputs and/or the system receives the type of CM to be used in the application or manufacturing process at step 704. At step 706, the system's processor(s) determines whether that identified CM is supported. If at step 706, the system determines that the identified CM is not supported ("No"), at step 808, the system defaults to a single mode (i.e., mass-mode). If the system determines that the identified CM is supported at step 706 ("Yes"), the processor(s) of the system initializes the dual modes (i.e., mass-mode and temperature mode) at step 710 by conducting a frequency sweep to identify the initial resonance frequencies of each mode (e.g., $f_M$(t=0) and $f_M$(t=0)). Once the dual-modes are initialized at step 710, the monitoring system will measure the mass-mode resonance ($f_M$) and temperature-mode resonance ($f_T$) at the next pre-determined time (e.g., $f_M$(t=100 ms) and $f_T$(t=100 ms)) at step 711. This allows determination of the change in frequency of the mass-mode ($\Delta f_M$) and the temperature-mode ($\Delta f_T$) at step 711. At step 712, the monitoring system fetches or receives the mode coefficients and the mass sensitivity coefficient for the two modes (mass-mode, e.g., at the c-mode fundamental frequency ($f^c_{100}$), and the temperature-mode, e.g., at the anharmonic frequency ($f^c_{102}$)) from, e.g., a Lookup Table (LUT) in the Flash memory of the instrument.

Solving for the temperature of the CM within a small sample period, for example 100 ms, is important as one of the uses of the invention is for semiconductor production applications, where the temperature of CM sensor can change rapidly due to carrier/precursor flow, plasma ON/OFF event, etc. A typical processor (e.g., a microcontroller or an FPGA) used in monitoring circuits for sensors may take a long time to solve roots of the cubic equation to derive the correct real root to derive the real-time temperature of the CM sensor. The method described herein facilitates solving for cubic root faster. The time overhead is removed from the updating loop to initialization stage to calculate a translated set of coefficients, which will then be stored in registers R0 through R9. Of these coefficients only coefficient R5 needs to be updated based on the real-time $\Delta f_M$ and $\Delta f_T$. This allows faster solution and updates of the temperature compensated thickness.

In semiconductor applications, the mass loading on the CM needs to be monitored at 10 Hz and there is a need to monitor at even higher rates, for example at 100 Hz or better. Solving a third degree polynomial to derive the cubic equation will take longer time for a typical microcontroller in a monitoring system. The method of invention uses a refined version of Cardano's analytical solution for cubic equation. The following operations can be performed in the sequence shown to derive the change in temperature over a measurement period. Once the mode coefficients and the mass sensitivity coefficient for the two modes are fetched in step 712, the coefficients R0 through R9 are calculated based on the mode coefficients and the mass sensitivity coefficient for the two modes and reduced at step 714. At step 716, reduced coefficients R0 through R4 and R6 through R9 are loaded into the register for use in determining ΔT and ΔM at step 718. However, at step 730, reduced coefficient R5 will be updated based on the change in frequency of the mass-mode ($\Delta f_M$) and the temperature-mode ($\Delta f_T$) over the measurement period as shown in the equations below. Reduced coefficient R5 is also used in determining ΔT and ΔM at step 718 as shown in the equations below. This strategy will reduce the time to solve for the new change in the temperature, hence the temperature compensated mass of the thickness rate.

$$\lambda = FetchDualModeCoefficients\,(CrystalType)$$

$$R = LoadReducedCoefficientsToRAM(\lambda)$$

$$R_5 = R_2 + R_3 \cdot \Delta f_T + R_4 \cdot \Delta f_{n:}$$

$$\Delta T = \sqrt[3]{R_5 + \sqrt{R_5 \cdot R_5 + R_1}} + \sqrt[3]{R_5 - \sqrt{R_5 \cdot R_5 + R_1}} - \frac{R_0}{3}$$

$$\Delta M = \frac{\Delta f_M - \left(R_9 \cdot \Delta T^3 + R_8 \cdot \Delta T^2 + R_7 \cdot \Delta T\right)}{R_6}.$$

$$\Delta T\,(\text{"SC70"},\ 27.635\ \text{Hz},\ -1365.216\ \text{Hz}) = \begin{pmatrix} 85.258 & \text{C} \\ 2.675 \times 10^{-5} & \text{mg} \end{pmatrix}$$

Once the temperature compensated incremental mass (ΔM) is known at step 718, it is translated using conventional techniques to the thickness rate of the particular film using film parameters at step 720. At step 722, the monitoring system determines whether to continue the dual-mode temperature compensation method or not. If the method does not continue, it stops at step 724. If the method continues, at step 711, the monitoring system will measure the mass-mode resonance ($f_M$) and temperature-mode resonance ($f_T$) at the next pre-determined time (e.g., $f_M$(t=200 ms) and $f_T$(t=200 ms)). This allows determination of the change in frequency of the mass-mode ($\Delta f_M$) and the temperature-mode ($\Delta f_T$) at step 726.

In the event the monitoring system determines at step 728 that temperature-mode is lost during the tracking, one of the following can be adopted until a chamber down time is available to replace the CM sensor. At step 710, the system can sweep to find other temperature modes that are available for the CM sensor (for example in the event $f^c_{102}$ temperature-mode is lost, the system can sweep to find the $f^b_{100}$ temperature-mode of the CM sensor). If none of the temperature mode is found, at step 709, the monitoring system can default to single mode measurement and learning from the data when both modes were available can be used to predict the temperature compensated mass. In semiconductor applications where the same recipe is called for every wafer this method may work until the chamber is down to replace out the CM sensor.

In one embodiment, the dual mode resonances are mode-locked and excited alternatively rather than simultaneously. This prevents mode hopping, which therefore prevents erroneous calculation of the compensated mass. This will make the mass and temperature translation more reliable.

Careful selection of the two modes where the temperature mode is more temperature sensitive than the mass-mode results in a single real solution for temperature at any given time.

In addition to compensating for temperature variations and impacts on frequency response of CM sensor, in one embodiment, the system also compensates for pressure changes and impacts. For example, in applications involving a very small mass loading on the CM sensor, the frequency change caused by the pressure on the SC-cut crystal can be accounted for using a pressure gauge along with pressure compensation techniques. In this case, a more pressure sensitive mode will be added to implement a three mode compensation.

While the present invention has been particularly shown and described with reference to certain exemplary embodiments, it will be understood by one skilled in the art that various changes in detail may be effected therein without departing from the spirit and scope of the invention that can be supported by the written description and drawings. Further, where exemplary embodiments are described with reference to a certain number of elements, it will be understood that the exemplary embodiments can be practiced utilizing either less than or more than the certain number of elements.

The invention claimed is:

1. A method of determining an incremental mass deposited on a crystal microbalance (CM) sensor comprising the steps of:

determining (i) a first resonance frequency of a first mode frequency, and (ii) a first resonance frequency of a second mode frequency at a first time;

determining (i) a second resonance frequency of the first mode frequency, and (ii) a second resonance frequency of the second mode frequency at a second time;

determining (i) a first mode frequency change between the second resonance frequency of the first mode frequency and the first resonance frequency of the first mode frequency, and (ii) a second mode frequency change between the second resonance frequency of the second mode frequency and the first resonance frequency of the second mode frequency;

determining the change in temperature of the CM sensor based on (i) the first mode frequency change, (ii) the second mode frequency change, and (iii) a plurality of coefficients based on the temperature sensitivity and mass sensitivity of the CM sensor; and determining the incremental mass deposited on the CM sensor based on (i) the change in temperature of the CM sensor, and (ii) the plurality of coefficients of the CM sensor, wherein the first resonance frequency and the second resonance frequency are excited alternatively.

2. The method of claim 1 further comprising the step of determining a thickness rate deposited on the CM sensor based on the incremental mass deposited on the CM sensor.

3. The method of claim 1, wherein the first mode frequency is a c-mode fundamental frequency ($f^c{}_{100}$)).

4. The method of claim 3, wherein the plurality of coefficients based on a temperature sensitivity and mass sensitivity of the CM sensor for the c-mode fundamental frequency ($f^c{}_{100}$) comprises a plurality of mode coefficients and a mass sensitivity coefficient.

5. The method of claim 1, wherein the second mode frequency is an anharmonic frequency ($f^c{}_{102}$).

6. The method of claim 5, wherein the plurality of coefficients based on a temperature sensitivity and mass sensitivity of the CM sensor for the anharmonic frequency ($f^c{}_{102}$) comprises a plurality of mode coefficients and a mass sensitivity coefficient.

7. The method claim 1, wherein the second mode frequency is a b-mode fundamental frequency ($f^b{}_{100}$).

8. The method of claim 1, wherein the CM sensor is an SC-cut crystal.

9. The method of claim 1, wherein the CM sensor is an AT-cut crystal.

10. The method of claim 1, further comprising the steps of:

calculating an alternate set of coefficients based on the plurality of coefficients based on a temperature sensitivity and mass sensitivity of the CM sensor; and reducing the alternate set of coefficients, wherein the change in temperature of the CM sensor is determined based on (i) the first mode frequency change, (ii) the second mode frequency change, and (iii) the reduced alternate set of coefficients.

* * * * *